US012694328B2

(12) United States Patent　　　(10) Patent No.:　　US 12,694,328 B2
　Chari et al.　　　　　　　　　　(45) Date of Patent:　　　　Jul. 28, 2026

(54) AUTOMATIC GENERATION OF TRAINING DATA FOR ANOMALY DETECTION USING OTHER USER'S DATA SAMPLES

(71) Applicant: ARKOSE LABS HOLDINGS, INC., San Francisco, CA (US)

(72) Inventors: Suresh N. Chari, Yorktown Heights, NY (US); Ian Michael Molloy, Chappaqua, NY (US); Youngja Park, Princeton, NJ (US)

(73) Assignee: ARKOSE LABS HOLDINGS, INC., San Francisco, CA (US)

( * ) Notice: Subject to any disclaimer, the term of this patent is extended or adjusted under 35 U.S.C. 154(b) by 1180 days.

(21) Appl. No.: 17/565,760

(22) Filed: Dec. 30, 2021

(65) Prior Publication Data

US 2022/0121995 A1　　Apr. 21, 2022

Related U.S. Application Data

(63) Continuation of application No. 16/150,922, filed on Oct. 3, 2018, now Pat. No. 11,227,232, which is a continuation of application No. 14/840,270, filed on Aug. 31, 2015, now Pat. No. 10,147,049.

(51) Int. Cl.
　　*G06N 20/00*　　　　(2019.01)
　　*G06F 21/55*　　　　(2013.01)
　　*G06N 20/20*　　　　(2019.01)
　　*H04L 9/40*　　　　(2022.01)
(52) U.S. Cl.
　　CPC ............. *G06N 20/00* (2019.01); *G06F 21/55* (2013.01); *G06F 21/554* (2013.01); *G06N*

*20/20* (2019.01); *H04L 63/1425* (2013.01); *G06F 2221/034* (2013.01)

(58) Field of Classification Search
　　None
　　See application file for complete search history.

(56) References Cited

U.S. PATENT DOCUMENTS

| | | | |
|---|---|---|---|
| 6,405,318 B1 * | 6/2002 | Rowland | G06F 21/552 |
| | | | 726/22 |
| 7,784,099 B2 | 8/2010 | Benjamin | |
| 9,003,523 B2 | 4/2015 | Stolfo et al. | |
| 10,147,049 B2 | 12/2018 | Chari et al. | |
| 2007/0061882 A1 | 3/2007 | Mukhopadhyay et al. | |
| 2014/0222379 A1 | 8/2014 | Martinez Heras et al. | |

(Continued)

OTHER PUBLICATIONS

Memory et al.; Context-Aware Insider Threat Detection; Activity Context-Aware System Architectures: Papers from the AAAI 2013 Workshop; pp. 44-47 (Year: 2013).*

(Continued)

*Primary Examiner* — Alan Chen
(74) *Attorney, Agent, or Firm* — Womble Bond Dickinson (US) LLP

(57)　　　ABSTRACT

A method of forming an anomaly detection monitor includes obtaining data samples of operations performed on an application by a plurality of users and detecting, by a processor, anomalous behavior associated with a target user of the plurality of users with respect to the application based on a portion of the data samples associated with the target user and a portion of the data samples associated with a second user of the plurality of users, different from the target user.

14 Claims, 12 Drawing Sheets

(56) References Cited

U.S. PATENT DOCUMENTS

| | | |
|---|---|---|
| 2014/0279779 A1 | 9/2014 | Zou et al. |
| 2015/0058982 A1 | 2/2015 | Eskin et al. |
| 2015/0092978 A1 | 4/2015 | Wu et al. |
| 2015/0235152 A1* | 8/2015 | Eldardiry .............. G06F 21/552 |
| | | 705/7.28 |
| 2016/0203316 A1 | 7/2016 | Mace et al. |
| 2016/0219067 A1 | 7/2016 | Han et al. |
| 2016/0219070 A1 | 7/2016 | Vasseur et al. |

OTHER PUBLICATIONS

Chandola et al., Anomaly Detection: A Survey; ACM Computing Surveys, vol. 41, No. 3, Article 15; Jul. 2009, Total p. 58 (Year: 2009).*
Van Leeuwen et al., Anomalous Human Behavior Detection: An adaptive approach, Signal Processing, Sensor Fusion, and Target Recognition XXII; Proc. of SPIE vol. 8745, 874519; 2013; Total p. 11 (Year: 2013).*
Park et al., Learning from Others: User Anomaly Detection Using Anomalous Samples from Other Users, ESORICS 2015, Part II, LNCS 9327, pp. 396-414, 2015. (Year: 2015).
Xu et al., A Hierarchical Framework Using Approximated Local Outlier Factor for Efficient Anomaly Detection, Procedia Computer Science 19, pp. 1174-1181 , 2013. (Year: 2013).

* cited by examiner

Reference-Points-Based LOF $(\mathcal{D}, U, K)$ $\mathcal{D}_u$ = extract samples of user $u$ from $\mathcal{D}$ for $(p \in \mathcal{D})$ do for $(q \in \mathcal{D}_u)$ do compute the distance between $p$ and $q$, $dist\ (p,q)$ end for end for for $(p \in \mathcal{D}_u)$ do $kNN(p) = K$ nearest neighbors of $p$ in $\mathcal{D}_u$ compute $LOF(p)$ using Equation (1)

end for

AUTOMATIC GENERATION OF TRAINING DATA FOR ANOMALY DETECTION USING OTHER USER'S DATA SAMPLES

This Application is a Continuation Application of U.S. patent application Ser. No. 16/150,922, filed on Oct. 3, 2018, which is a Continuation Application of U.S. patent application Ser. No. 14/840,270, filed on Aug. 31, 2015, now U.S. Pat. No. 10,147,049, issued Dec. 4, 2018, the entire disclosures of which are hereby incorporated by reference herein.

BACKGROUND

The present invention relates to security on computers, and more specifically, a method to train a model for an anomalous behavior monitor for individual users. More specifically, the present invention teaches an adaptation of the Local Outlier Factor (LOF) algorithm to select benign samples from the target user's own data points and to select anomalous samples from other system users' data points so that, both anomalous and benign samples can be obtained for training an anomaly detection model for the target user.

Introduction

Machine learning (ML) is increasingly used as a key technique in solving many security problems such as botnet detection, transactional fraud, insider threat, etc. Driven by an almost endless stream of well publicized cases, such as Wikileaks and Snowden, of information theft by malicious insiders, there is increased interest for monitoring systems to detect anomalous user behavior. Today, in addition to traditional access control and other security controls, organizations actively deploy activity monitoring mechanisms to detect such attacks. Activity monitoring is done through enforced rules as well as anomaly detection using ML techniques. Thus, anomaly detection has been an important research problem in security analysis.

Anomaly detection, however, has been a challenge in such security analysis. One of the key challenges to the widespread application of ML in security is the lack of labeled samples from real applications. However, in many security applications, it is difficult to obtain labeled samples, as each attack can be unique, and, thus, applying supervised techniques such as multi-class classification is not feasible. Instead, to defect novel, as-yet-unseen attacks, researchers have used unsupervised outlier detection or one-class classification approaches by treating existing samples as benign samples. These methods, however, tend to yield high false positive rates, preventing their adoption in real applications.

To best apply ML techniques, it is ideal if a model can be trained with lots of both anomalous samples and benign samples. This is often very difficult for security applications: it is often unrealistic to expect to gather enough anomalous samples for labeling. This lack of anomalous samples prohibits the applicability of more accurate classification techniques, and, therefore, most existing monitoring applications have adopted anomaly detection or one-class classification techniques. These methods construct a profile of a subject's mortal behavior using the subject's past behavior by treating them as benign samples and compare a new observed behavior with the normal profile, resulting in high false positive cases.

The lack of labeled data can also extend to samples of normal activity. Existing approaches treat the target user's behavior in the training period as strictly benign. In some situations, there may be only a small number of samples to learn a user's normal behavior, or the user's samples actually contain anomalous cases, and, thus, training with this data can result in high false negative rates.

To solve these problems, several anomaly detection methods tried to artificially generate samples as a second class based on some heuristics, thereby posing a one-class classification task as a binary classification problem. For example, in a word spotting application, a method artificially enlarges the number of training talkers to increase variability of training samples. One talker's speech pattern is transferred to that of a new talker by generating more varied training examples of keywords. In another approach a resampling method is applied to generate a random sample by choosing each of its coordinates randomly from the coordinate values that are in the data.

Later, a distribution-based artificial anomaly generation method was proposed which first measures the density of each feature value in the original data set and then artificially generates anomaly points near to the normal data points by replacing low-density features with a different value in method assumes that the boundary between the known and anomalous instances is very close to the existing data, hence "near misses" can be safely assumed to be anomalous. However, this method is not applicable to data with a very high dimensionality or with continuous variables.

In yet another approach, the density estimation (unsupervised learning) problem was transformed into one of supervised learning using artificially generated data in the context of association rule learning. A reference model, such as uniform or Gaussian, was used to generate artificial training samples as "contrast" statistics that provide information concerning departures of the data density from the chosen reference density. While these data points are generated from the data, they do not represent actual behavior in most real-world problems. Following this principle, another research group further proposed to employ the training data from the target class to generate artificial data based on a known reference distribution. But it restricted the underlying classification algorithm to produce class probability estimates rather than a binary decision.

Despite some successes of the above methods, they suffer either from strong restrictions, which made them not applicable to problems with high dimensional data, other application domains, or from the requirement of estimating the reference data distribution, which is usually not accurate and may lead to suboptimal performance.

The method of the present invention addresses both these problems/limitations: (1) artificially generated samples that do not reflect real cases; and (2) assuming an underlying data distribution, which is unrealistic in multi-user environments.

SUMMARY

According to an exemplary embodiment of the present invention, described herein is a local outlier factor (LOF) based method to automatically generate both benign and malicious training samples from unlabeled data. This LOF-based sampling provides a unified mechanism to filter out bad normal samples and generate potential anomalous samples for each target user.

To accomplish this purpose, the present inventors have observed that, in many monitoring applications, when multiple users share a system, they can be observed as exhibiting distinct behavioral patterns. Examples of such scenarios include user authentication determining the authenticity of a user based on users' keystroke patterns, insider threat detection identifying deviation of a user's access patterns from past behavior, and social network analysis detecting anomaly in a user's collaboration patterns.

In each of these scenarios, it would be expected that others' behavioral patterns would be distinct from those of a target user being monitored for possible abnormal behavioral patterns. Thus, the present inventors have recognized that other users' samples can be utilized to estimate the target user's possible abnormal behavioral patterns, without relying on distribution patterns or generating random samples. The present invention leverages these other users' samples as "abnormal" samples to help a ML classifier to learn a boundary between the target user's expected and unexpected behavior. There are no assumptions made about the distribution of anomalous samples, no manual labeling is necessary, and the approach is independent of any underlying learning algorithm.

FIG. 1 shows exemplarily the scenario 100 utilizing the concepts of the present invention, wherein user 110 is the "target user" whose activities are being subjected to developing a classifier for an anomalous detection monitor on the target user's future activity on the system. Because anomalous samples are not readily available as input samples for developing the classifier for the target user 110, the present invention will utilize at least some of the normal data samples from other users 120, 130 who also access and use the same system or application 140, to serve as anomalous samples for the target user 110.

Upon completion of the processing to Obtain the normal/abnormal sample sets for target user 110, another user, for example, user 120, could become the next target user for processing, and user 110 then assumes the role of one of the other users relative to new target user 120.

Along this line, it is noted that there are a number of "users" described herein: the "target user", "other users", the "plurality of users on the system/application" (which consists of the target user and other users), and the "user" who operates a tool/application that implements the present invention described herein. Although the terms "target user", "other users", and "plurality of users" should be clear from the context in this disclosure, to more clearly distinguish the user/operator/administrator who is implementing or controlling an application that implements the methods of the present invention, the term "operator/administrator" will be used herein to describe this user/operator/administrator.

The effectiveness of the approach of the present invention was evaluated on several datasets, and the testing results confirm that in almost all cases the technique performs significantly better than both one-class classification methods and prior two-class classification methods. The method is a general technique that can be used in many security applications.

BRIEF DESCRIPTION OF THE DRAWINGS

FIG. 5 shows an exemplary algorithm 500 for the reference points based LOF processing;

DETAILED DESCRIPTION

Figure 1:
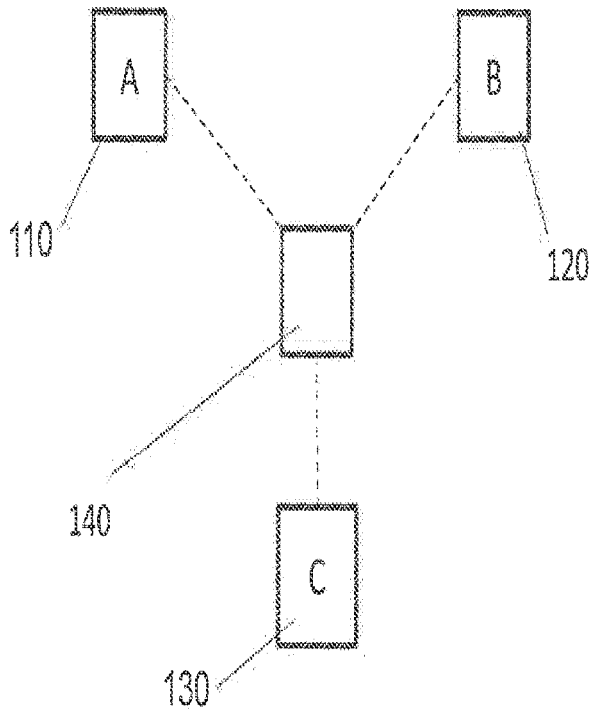
FIG. 1 shows an exemplary scenario 100 that demonstrates the concerns and insight relevant to the present invention.

The present invention focuses on a method of providing abnormal behavior samples for a targeted user for use in developing, for example, an ML classifier for a normal/abnormal behavioral pattern detector for a system or application shared by multiple users. According to the present invention, in such scenarios, a target user's normal behavior is learned using training samples of the target user's own past behavior samples, whereas the target user's possible abnormal behavioral patterns can be learned from other users' training samples, since the other users expectedly exhibit quite different behavioral patterns from the target user.

Standard anomaly detection techniques, such as statistical analysis or one-class classification, aim to rank new samples based on their similarity to the model of the negative samples, assuming that all previously known samples are negative (benign). Many approaches use distance or density of the points as a measurement for the similarity, in which data points with the lowest density or the longest average distance to the previously known (negative) samples are considered most anomalous.

In contrast and as noted, the approach of the present invention makes no assumption on the underlying data distribution. It assumes that data samples in these applications are generated independently by many users with different underlying distributions. Consider, for example, the case of detecting anomalous user access to a source code repository shared by many employees. In this case, one would expect that users' access patterns will depend on their role in the organization or project and will, in general, be different from each other. For instance, software developers might be expected to exhibit similar access patterns, e.g., accessing the repository regularly during business hours, and to be significantly different from the access patterns of testers, business managers, backup administrators, etc.

Further, the present inventors assume that, in these multi-user applications, malicious actors often change their behaviors subtly or try to impersonate another person to hide their malicious intention. Thus, an anomalous point of a user's behavior can look perfectly normal in the global view, but anomaly detection per user can detect these stealth attacks better than a global anomaly detection. However, while user-specific modeling can produce more accurate detection, the data sparseness problem becomes even worse. In this case, in addition to the lack of anomalous cases, there may not be enough benign cases for some users, such as new users or non active users.

The present invention addresses the lack of labeled samples by exploiting data samples from the other users in the target application. A key intuitive concept underlying the present invention is that, when there are many users, other users' behavior can provide additional insights on potential anomalies. Thus, it is assumed that a user's actions are similar to each other and tend to form a few clusters occupying a small area in the data space. However, when data samples from many users are combined, they provide more accurate projection of the entire data space and help to estimate accurate boundaries between different users.

Thus, a key feature of the present invention is to provide a mechanism to generate anomalous samples automatically from other users' behaviors. To identify possibly anomalous samples for a target user, the method adopts a common definition of anomaly which considers the data points in low density areas is anomalous. In an exemplary embodiment, all samples of all users in the data set are examined, and samples that are considered different from a target user's data samples are identified. The inventors extend the Local Outlier Factor (LOF) processing to estimate the degree of "outlier-ness" with respect to samples of a target user and to select anomalous samples for the target user from other users' data samples which have high LOF with respect to the target user's data samples.

Figure 2:
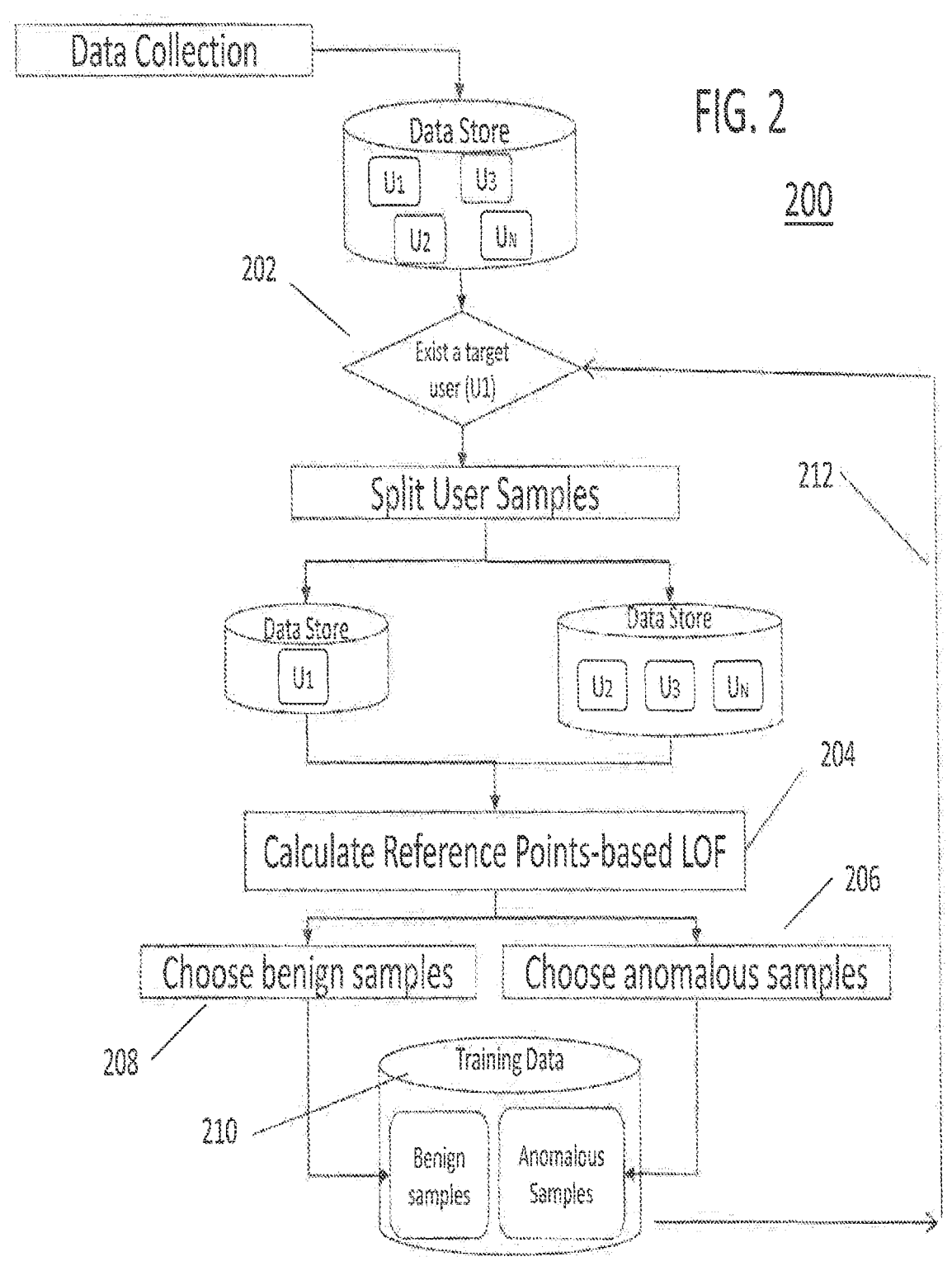
FIG. 2 shows an exemplary high-level diagram 200 of an exemplary method of the reference point-based LOF technique of the present invention.

Described herein and exemplarily illustrated at a higher level 200 in FIG. 2 is a new local density-based method for selecting a good set of anomalous samples for a target user (step 202 shows $U_1$ being currently processed as the target user) from the other users' (e.g., $U_2, U_3, \ldots U_N$) sample set. For a given target user, the Local Outlier Factor (LOF) value is calculated (step 204) for all data points with respect to the target user's data points, and data points from other users' samples that are selectively distant from the target user's data are chosen (step 206) as anomalous samples for target user U1. This method, which the inventors refer to as "reference points-based LOF", gives an estimate of the degree of "outlier-ness" of the other data points with respect to the target user's behavior.

Given this measure of LOF, in non-limiting exemplary embodiments, two exemplary alternative strategies, to be described in more detail, can be used to select abnormal samples for a target user: use the points with the highest LOF, which deviate the most from the target user's data points, or use the points with the lowest LOF above a certain threshold, which are just "slightly different" from the target user's data. With such or similar reference to the target user's own data points, the present invention generates anomalous samples for the target user from other users' data samples which have high LOF with respect to the target user's data samples.

It should be noted that the two alternative methods of using lowest LOF and highest LOF are exemplary only and non-limiting, since it should be clear that middle ranges of LOF could also serve as means to obtain the target user's abnormal samples.

Figure 3:
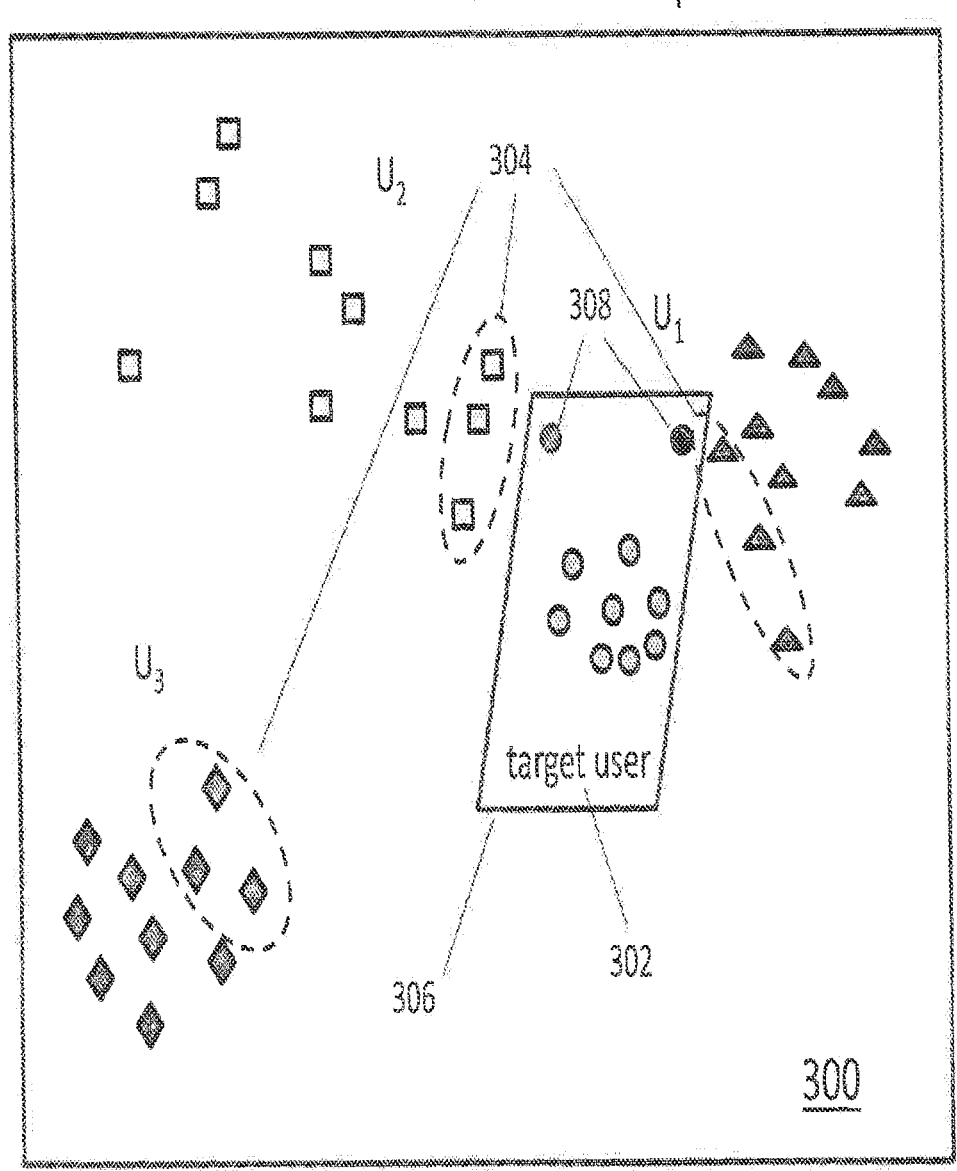
FIG. 3 shows the normal sample selection stage 300 of the present invention.

FIG. 3 shows exemplarily the second of these two exemplary alternatives, wherein, for an arbitrary target user 302, the dotted lines 304 demarcate the samples from other users' U1, U2, U3 data samples that are chosen to be anomalous data for target user 302. Trapezoid 300 encircles the target user's sample data. It should be noted how the cloned lines 304, to become abnormal samples for target user 302, encircle the other users' data points that are closest to the cluster of target user's sample points.

Further, a benign sample set (e.g., 208 in FIG. 2) for training a model for the target user can be the target user's own data 306. In a variation of forming the benign sample set, the data points 308 with high LOF score within the target user's own sample data are considered outliers. In this variation, these high LOF points 308 are removed from the target user's data points to thereby provide a less noisy, more coherent benign sample set for the target user. Thus, in this variation, the target user's points remaining after the high LOF points are removed are used as benign sample data for the target user.

The benign sample set and the anomalous sample set can be provided as output data for consumption as training data 210 (FIG. 2) for a classifier in an anomaly detection system monitoring the target user. In step 212 of FIG. 2, the next target user of the plurality of users $U_1, U_2, U_3, U_N$ is selected, until all users on the system that are desired to be monitored have been subjected to the target user processing.

This method 200 solves limitations of existing methods by reason that there are no assumptions made about the distribution of anomalous samples, no manual labeling is necessary, and it is independent of the underlying learning algorithms.

Figure 4:
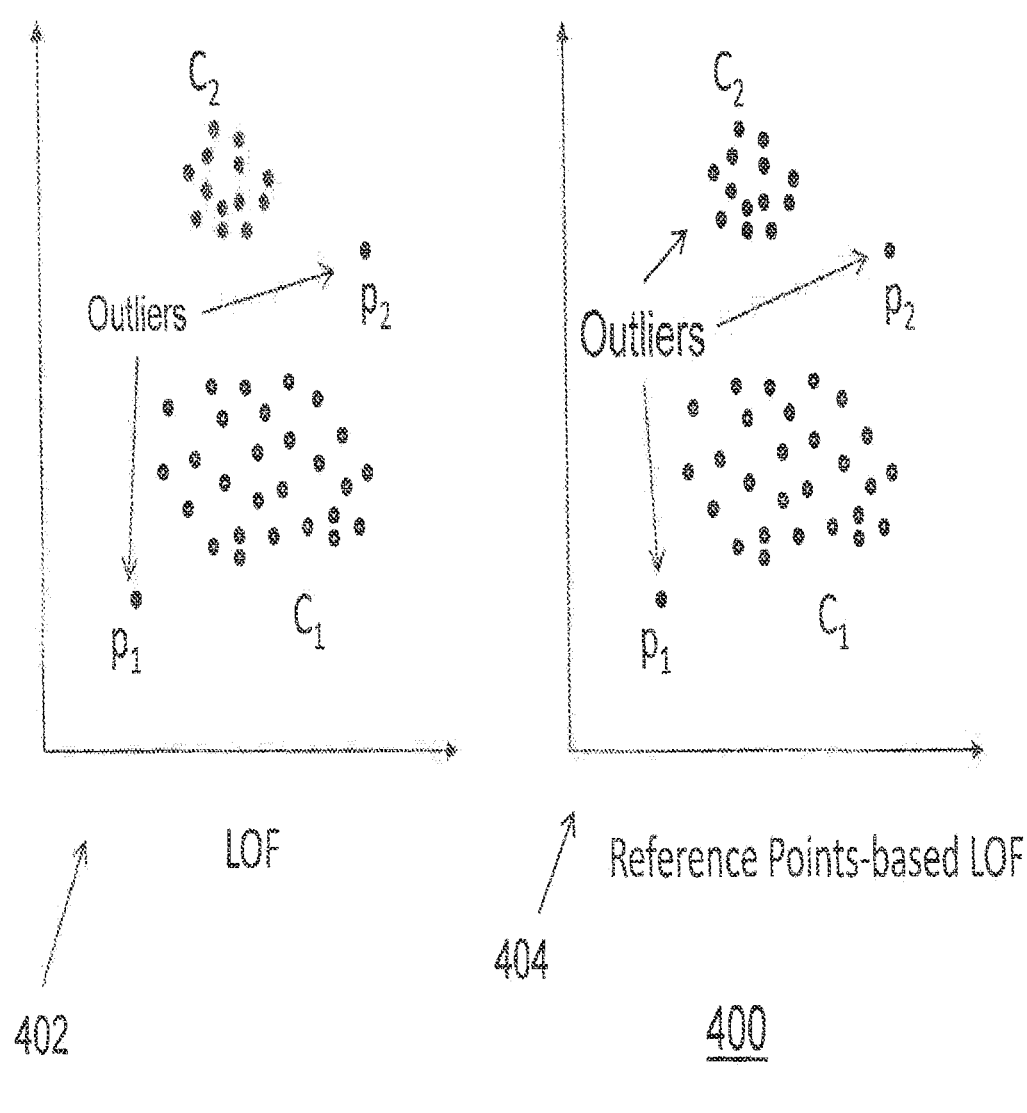
FIG. 4 exemplarily outliers 402 using conventional, standard LOF calculations compared with the outliers 404 calculated using the reference point-based LOF technique of the present invention.

The target user's data points are herein referred to as the "reference points", and the variation of applying the standard LOF processing on these reference points are referred to as the "reference points-based LOF. FIG. 4 illustrates the difference between outliers based on the standard LOP 402 and outliers based on the reference points-based LOP of the present invention 404.

As shown in FIG. 4, standard anomaly detection methods will identify two clusters of dense area and detect only the two data points p1 and p2 as outliers as shown in 402. However, the reference points-based outlier detection method 404 will measure the density of all the points with respect to their distance to the reference points (C1), and thus will consider all the data points in C2 as outliers as well as points p1 and p2.

Exemplary main differences of the approach of the reference points-based LOP from other density-based anomaly detection methods include:

1. The outlier-mess of a data point with respect to a fixed set of existing data points in the space is measured; and
2. Low density samples are used as anomalous samples to build a binary classifier.

User Data Clusters

As could be surmised from the data shown exemplarily in FIGS. 3 and 4, there is a reasonable concern that, if the data points of a target user (i.e., reference points) are mingled with other users' samples and indistinguishable, this new method described herein would not work well. To test and validate an assumption that a user's actions tend to form close clusters in the data space, the present inventors analyzed a data set of 51 distinct users containing 200 cases for each user (i.e., 10,200 cases in total) from a dynamic keystroke analysis study. They considered the 200 instances of the first user as the reference points and computed the LOP scores for all 10,200 samples with respect to the 200 reference points.

The result demonstrated that all samples belonging to a first user have very low LOP scores, while other users' data points have much higher LOF scores, thereby confirming that the data points belonging to a user are dose to each other, while data points from other users are separated. The analysis of this experiment supported the inventors' hypothesis on exploiting other users' data points to generate anomalous samples for a target user.

It is noted that, in some cases, when other users' sample data points overlap the cluster of the target user's sample data points, then the reference points-based LOF function will ignore these overlapping data points since they will not be low-density points relative to the target user's cluster of points.

Reference Points-Based LOF

In this section, the reference points-based LOF method is more precisely explained. The task is to build for each user an anomaly detection model with both normal and anomalous samples for each target user. In this discussion, because of the absence of labeled anomalous samples, other users' samples are explored as potential anomalous points for a target user, such that possible anomalous samples for each user are found from the other users' normal samples. The basic idea is to measure the degree of "outlier-ness" of all the training samples and to identify the data points that deviate from the target user's samples.

In density-based anomaly detection, a data point is considered as an outlier if the local density of the point is substantially lower than its neighbors. In this work, we use the Local Outlier Factor (LOF) for local density estimation, where the local area is determined by its k nearest neighbors from the target user is defined by Equation 1:

$$LOF(p) = \frac{\sum_{q \in kNN(p)} \frac{LRD(q)}{LRD(p)}}{|kNN(p)|} \quad (1)$$

Where the local reachability distance (LRD) is defined as in Equation 2:

$$LRD(p) = \frac{|kNN(p)|}{\sum_{q \in kNN(p)} \max\{k - distance(q), dist(p, q)\}} \quad (2)$$

where k-distance(q) be the distance of the point q to its k-th nearest neighbor.

Stated slightly differently, let U be the set of users, D be the set of data points for all the users, $D_u$ be the data points of a target user u, and $\overline{D_u}$ be the data points from all other users except u, i.e., $D = D_u \cup \overline{D_u}$. Unlike the standard LOF, where k-nearest neighbors are found from the entire data set, the present invention computes the LOF values of all data points $P \in D$ based on their distance to the k-nearest neighbors from the target user's data points, $D_u$.

Figure 5:
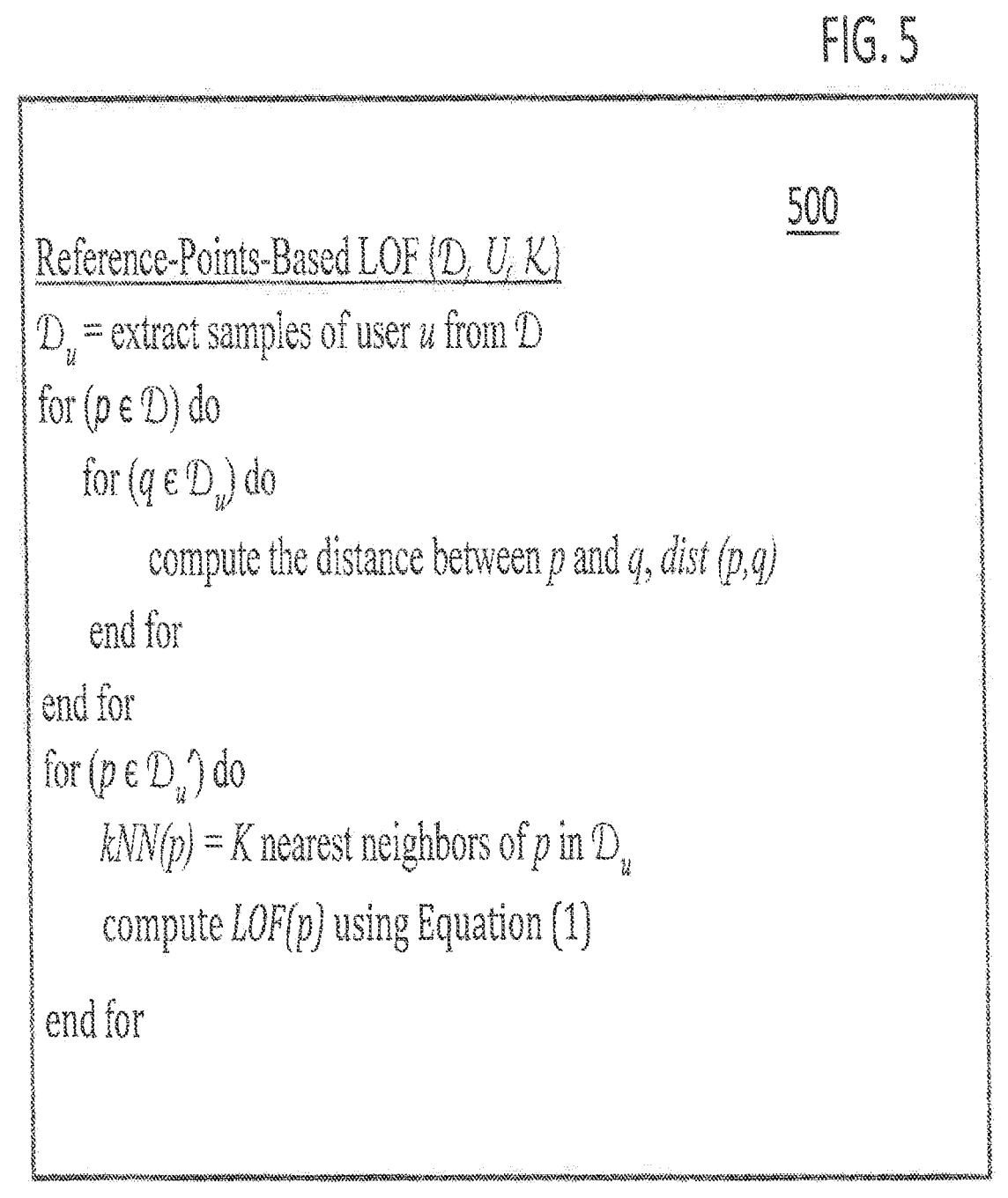

Thus, in the present invention, the Local Outlier Factor (LOF) is applied for local density estimation. However, the local area of a data point is determined by its k nearest neighbors from the target user samples, unlike the standard LOF where the k nearest neighbors are chosen from the entire set. Hence, the present inventors refer to the method of their invention as the "Reference-points based LOF". FIG. 5 provides an exemplary algorithm 500 for computing LOF based on the cluster of the target user's set of samples serving as the reference points.

In an exemplary embodiment, the distance between two data points p and q is computed using a normalized. Manhattan distance:

$$dist(p, q) = \sum_i \frac{|p_i - q_i|}{\max(i) - \min(i)} \quad (3)$$

where max(i) and mini(i) denote the maximum and minimum value for the i-th features respectively.

It is noted that any distance metric can be used here, and, it is strongly recommended to find the best distance metric for the target data.

Further, alternative to the k-nearest neighbors, one can use the c-neighborhood as described in the DBSCAN (Density-Based Spatial Clustering of Applications with Noise) clustering algorithm. In this case the degree of outlier-ness of a sample p can be computed as the average distance to the data points in its directly reachable neighbors. It is noted that DBSCAN is one of the most common clustering algorithms and often cited in scientific literature. It is a density-based data clustering algorithm: given a set of points in some space, it groups together points that are closely packed together (i.e., points with many nearby neighbors), and considers as outliers those points that lie alone in low-density regions (i.e., whose nearest neighbors are too far away).

Normal/Abnormal Behavior Detection

Figure 6:
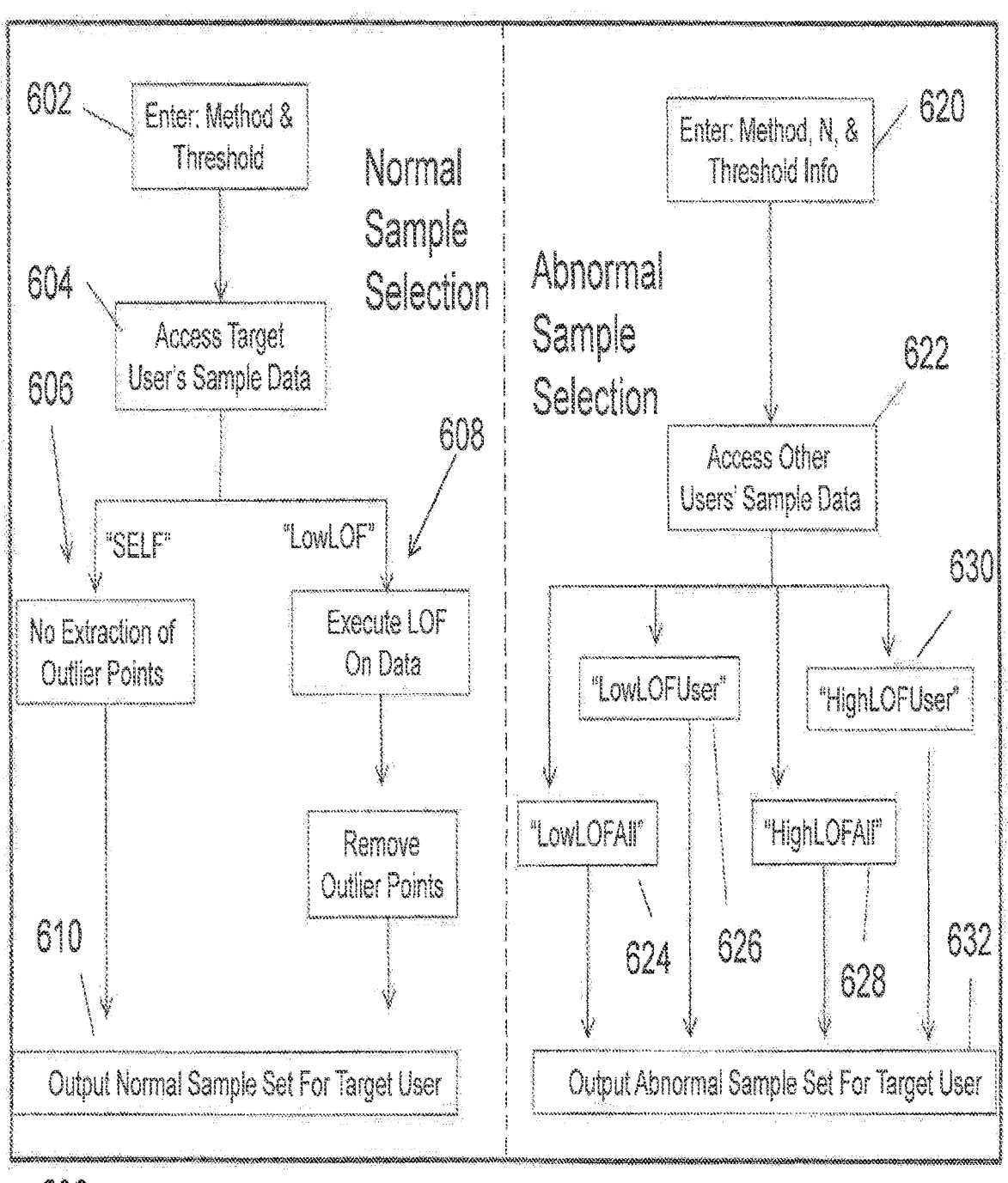
FIG. 6 shows the flow of processing 600 in an exemplary embodiment of the present invention.

In this section, several non-limiting, exemplary strategies are explored for generating a labeled training set based on the reference points-based LOF described above. The following sections describe possible strategies for choosing normal samples and anomalous samples, respectively. Note that the algorithm above computes the LOF scores for all data points including both the target user's data points and other users' data points. The LOF scores are used to select both normal and abnormal samples to train a two-class classification model for each user:

FIG. 6 shows a flowchart 600 of an exemplary tool that would implement this more detailed description of these exemplary alternative normal and abnormal sample selection mechanisms, including inputs from a user to enter method selection, threshold information, and desired number of anomalous samples N to be output by the selected method.

Normal Sample Selection Stage

The present invention envisions two methods, shown on the left side of FIG. 6, to generate the normal sample set for training of the target user's normal behavior.

As shown in step 602, the operator/administrator will provide inputs to select the method (either "SELF" or "LowLOF") for processing the target user's normal sample set and threshold information if the outliers are to be extracted from the target user's data. In step 604 the target user's sample data is accessed. Based on the method selection, on the two following mechanisms will then be executed.

1. All Self Samples (SELF): This method 606 uses all the samples from the target user during the training period as normal samples, similarly to conventional unsupervised anomaly detection or the conventional one-class classification approach. Step 604 shows this first alternative.

2. No Outlier Samples (LowLOF): In this method 608, LOF values are computed for the target user's own samples as well. The data points with relatively high LOF scores are outliers in the target user's samples. These outlier samples from the target user's own sample set are discarded and the remaining samples are used as normal samples for training. This strategy can be used to handle noisy data.

In this LowLOF processing 608, the threshold value is used in the LOF processing of the target user's samples to determine outlier points in the target user's sample data, so that the outlier point can be discarded. In step 610, the selected processing result is provided as output for the target user's sample set.

Although the above description implies an operator/administrator, it is noted that the processing of this tool could be automated to occur periodically, and some values could be default values and/or updated over time, including possibly updating using a feedback mechanism.

Abnormal Sample Selection Stage

For anomalous training sample generation, as shown on the right side of FIG. 6, the present invention aims to find a variety of samples that (1) are outside of the target user's samples, i.e., outliers from the perspective of the target user, and (2) can also represent the entire data set. The right side of FIG. 6 shows exemplarily four alternative LOF-based mechanisms for generating abnormal (anomalous) sample sets for a target user.

First, in step 620, the operator/administrator inputs provide desired method selection, threshold information to use in determining a boundary for outliers and inliers, and desired total number of anomalous samples N for the target user. Again, as noted above in the discussion of the normal sample selection, it is possible to implement the present invention so that the processing could be automatically invoked without involvement by an actual human operator/administrator, and some of the entries could be preset or default values, or could be automatically updated over time.

An optimal threshold value could be determined empirically for the given data set. A basic guideline is that the threshold value needs to separate most of the target user's samples from the rest of the data points. Various methods for determining a threshold can be used. A simple way to set the threshold is to use a predetermined LOF value, but this method is hot optimal because different data sets may need a different LOF value. Alternatively, we can find a threshold value automatically from the data. For instance, we can choose an LOF value as the threshold, in which the LOF values of 95% of the target user's data points stay below the threshold. In yet another embodiment, we can display the LOF values for the target user's samples and those of other users' samples, and let the user choose an optimal threshold value.

All the samples from other users that have LOF higher than the threshold are considered as potential anomalous samples for the target user. The invention describes four different strategies for selecting anomalous samples from the potential anomalous samples for the target user. First, we can choose Low LOF samples from all of the potential anomalous samples. Second, we can choose High LOF samples from all of the potential anomalous samples. It is noted that it is desirable to generate anomalous samples from each of the other users for the target user in many situations. Suppose we want to select N anomalous samples, and there are m other users, we would preferably generate approximately N/m samples from each user. By choosing samples from as many other users as possible, we ensure the anomalous sample set represents a diverse set of abnormal situations. We can then apply both the Low LOF sampling and High LOF sampling for each of the users. In other words, we select N/m samples with lowest or highest LOF values from each of the users from the potential anomalous samples respectively. In step 622, sample data for the other users is accessed, to be processed in accordance with the selected method.

For anomalous training sample generation, the following four alternative strategies 624, 626, 628, 630 are suggested as possible exemplary strategies to be applied to extract anomalous samples for the target user. These strategies aim to find other users' samples that are outside of the target user's samples, i.e., outliers from the perspective of the target user. User input 620 provides instructions to select one of the four alternative processings 624-630 and step 632 provides the results of the selected processing as output data for the target user's abnormal data sample set.

1. Boundary Sampling (LowLOFAll): Out of all other users' samples that have LOF higher than a threshold, the samples with lowest LOF scores are chosen. This method 624 finds anomalous samples that are located close to the boundaries. These samples would have higher LOF scores than most of the target user's samples, but have lower LOF scores than most of the other users' samples.

2. Boundary Sampling Per User (LowLOFUser): This method 626 is also intended to choose boundary samples. However, this method 626 selects low LOF samples from each of the other users. If we want to generate N anomalous samples, and there are m other users, we generate approximately N/m samples from each user.

3. Outlier Sampling (HighLOFAll): This method 628 generates anomalous samples which deviate most from the target users' samples, i.e., samples with highest LOF scores from the sample set from all the other users as in LowLOFAll.

4. Outlier Sampling per User (HighLOFUser): This method 630 is similar to LowLOFUser. The difference is that it chooses samples with highest LOF scores from each of the other users.

It is noted that the algorithm chooses anomalous samples which have an LOF score higher than a threshold to exclude other users' samples that are inside of or too close to the target user's region. Further, the LowLOF method for generating normal samples can also discard a few normal samples. Thus, for very small data sets like the Typist data set, the algorithm can generate a smaller number of samples than requested.

Training Sample Generation

Figure 7:
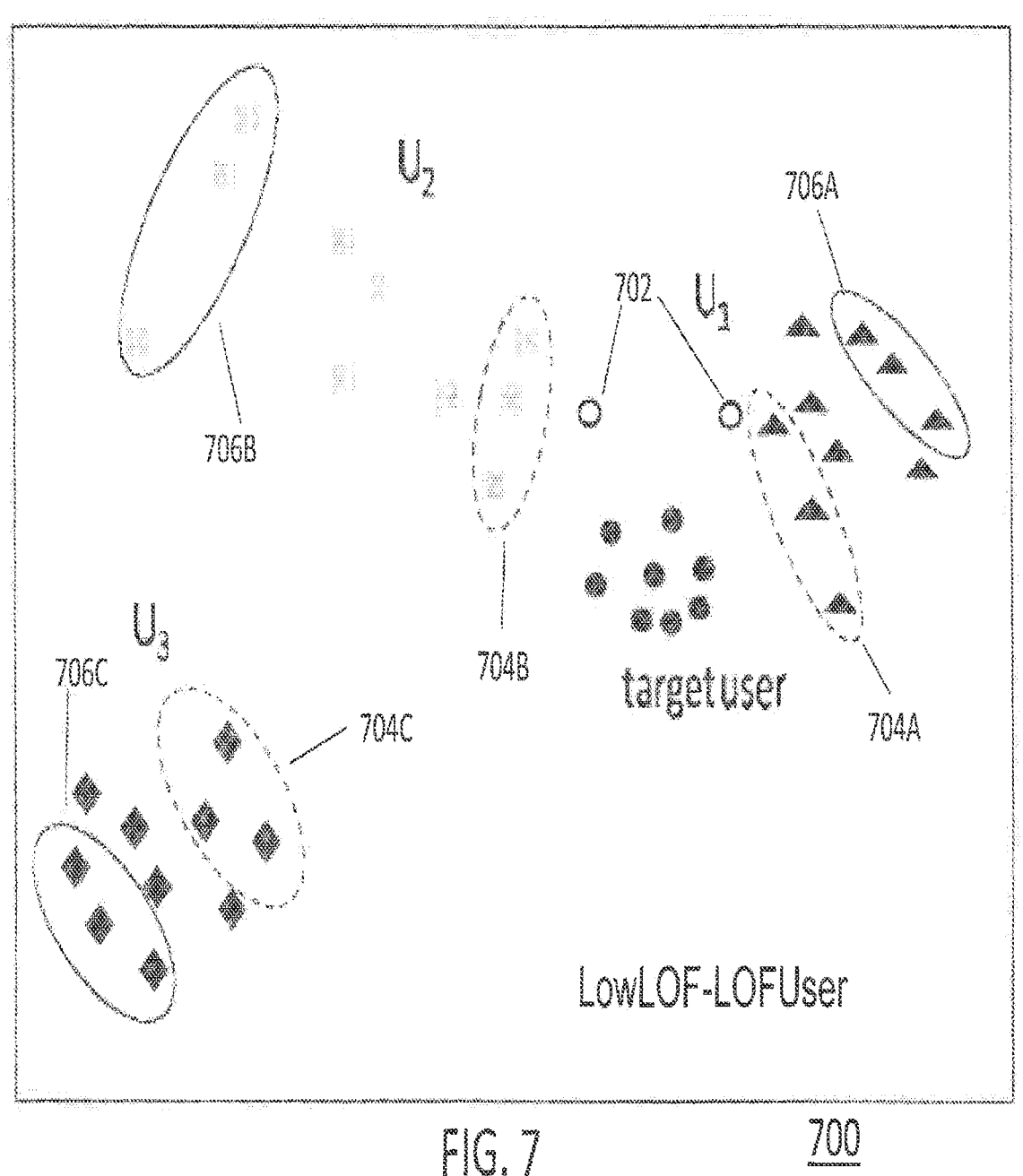
FIG. 7 shows exemplarily results 700 using LowLOF-LowLOFUser and LowLOF-HighLOFUser.
Figure 8:
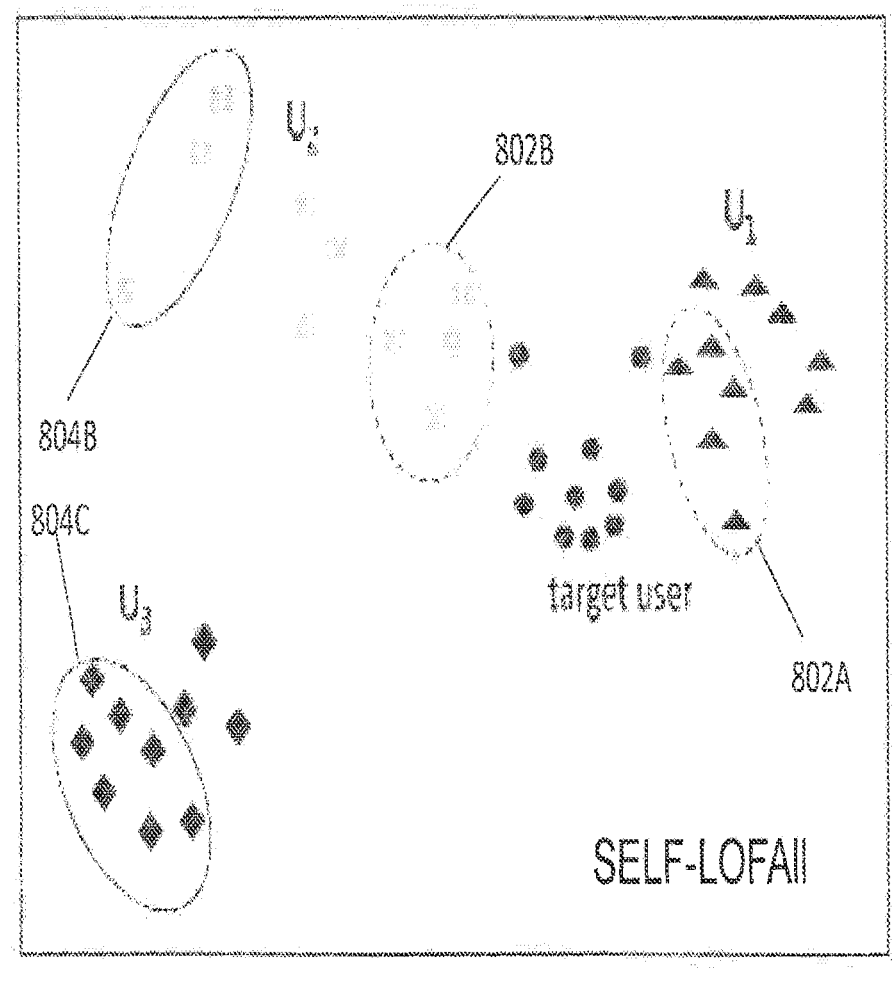
FIG. 8 shows exemplarily results 800 using SELF-LowLOFAll and SELF-HighLOFAll.

By combining the two methods for normal sample generation (left side of FIG. 6) and the four methods for abnormal samples (right side of FIG. 6), eight different permutations for generating training samples are potentially available. FIGS. 7 and 8 demonstrate the different results from these possible permutations. The methods are labeled in these figures in the order 'Normal Sampling Method'-'Abnormal Sampling Method'. Thus, FIG. 7 shows the LowLOF normal sampling method along with the two LOFUser abnormal sampling methods, and FIG. 8 shows the "SELF" normal sampling method with the two LOFAll abnormal sampling methods.

In FIGS. 7 and 8, the circle points are the data samples of the target user, and the triangle, square and diamond points belong to the other three users, U1, U2, and U3, respectively. FIG. 7 shows the LowLOF (i.e., outlier points 702 are determined and extracted from the target user's data sample) method for developing the normal sampling set for the target user, and FIG. 8 shows the SELF method (entire target user sample set is used, no outlier points are detected and removed) for the normal sampling set far the target user.

Moreover, suppose that it is desired to include nine anomalous samples in the training data set. Accordingly, FIG. 7 shows the two "per-user" basis sampling methods, LowLOFUser and HighLOFUser, and shows that three samples from each user will be chosen. The points enclosed by dashed lines 704A, 704B, 704C are selected by the LowLOFUser method (note that these are other users' points closest to the target user's cluster), while the points enclosed by solid lines 706A, 706B, 706C are chosen by the High-LOFUser method (note that these are other users' points fartherest from the target user's cluster). FIG. 8 shows anomalous samples for the target user as selected by Low-LOFAll (dashed line 802A, 802B) and HighLOFAll (solid line 804B, 804C). Note that the desired nine points differ between the LowLOFAll and HighLOFAll mechanisms.

Further, we can extend these anomalous sample methods to apply ensemble methods, in which multiple anomaly detection methods are built based on a different training set. We can generate different training sets using different sub-sets of other users. When we have in other users, we can divide the in users into k subgroups of users, $U_1, \ldots, U_k$. Then, we apply one of the four strategies to each of the subgroups, and produce k different training sets comprising both normal samples and anomalous samples. Note that the k training sets contain the same normal samples but different anomalous samples. We then build k different models for the target user, and anomaly detection can be carried out by winning the k models and by aggregating their results.

Binary Classification

Although the present invention is directed more to the reference-points-LOF-based mechanism of determining anomalous and normal sample sets, this section describes how this mechanism can be utilized in various application environments and can be evaluated. Having both normal and anomalous samples in the training data allows the anomaly detection task to be cast as a two-class classification problem, so that a classifier can be learned that can discriminate the abnormal samples from the normal samples. Any classification algorithm can be applied and may be chosen based on the application.

To evaluate the present invention, classification algorithms were used that produce the class probability as an output, rather than a binary decision. The advantage of having class probability estimation over a binary decision of normal versus abnormal is that the system administrators can adjust the ratio of alarms according to available resources and costs. In this evaluation, experiments were conducted with three classification algorithms: Decision Tree, Logistic Regression, and Random Forest, and the sampling methods of the present invention were evaluated with three publicly available data sets and one private data set from information security application: Keystroke Dynamics Benchmark Data; Typist Recognition Data; DBLP Collaboration Network Data; and Access Log Data.

The Keystroke Dynamics Benchmark Data is a data set of keystroke data collected from 51 users typing the same strong password 400 times, broken into eight equal-length sessions. Various timing features were measured such as the length of time between each keystroke; and the time each key was depressed. The Typist Recognition Data is a data set of typing patterns of ten different users as used to build a classifier to identify individual typists. The typing pattern are represented by eight features such as typing speed and error rate (backspace). The typing behavior of the users is broken into units, approximately one paragraph's worth of typing. Each user contains between 24 and 75 records with an average of 53.3.

The DBLP Collaboration Network Data is a large database of publications from computer science journals, conferences, and workshops. The present invention was tested by using it to build models to learn what a "normal" paper title is for an author.

The Access Log Data is an access log data set that comes from a source code repository used in a large IT company. The logs were collected over 5 years and consist of 2,623 unique users, 298,365 unique directories, 1,162,259 unique files, and 68,736,222 total accesses. Each log contains a timestamp, a user ID, a resource name, and the action performed on the resource. These logs were processed down to individual periods per user which represent the user's behavior in a given week. The features include the number of total accesses, the number of unique accesses in that period, new unique accesses given a user's history, counts for the actions performed, counts for the file extensions accessed, and similarity scores to the target user. The similarity scores represent how similar a user is to the other users given the user's current access pattern and the other users' past access patterns.

Evaluation Method

While it can be assumed that most of a target user's activity is benign, it would be desirable to prevent training data from containing samples of malicious behavior to be detected. For example, if the target user's account is compromised by an adversary, the classifier should not have been trained on the activity of the adversary. For this reason, ac classifier can be trained and tested on different user groups. For each target user, a K-fold cross validation can be performed by dividing the user population into K disjoint sets of training and testing user groups.

For example, suppose there are three users U1, U2 and U3, and U1 is the target user. A classifier is trained on U1 and U2 and tested on U1 and U3. A second classifier is trained on U1 and U3 and tested on U1 and U2. The user actions are also split into training and testing samples using a pivot point in time when applicable, that is, all training actions occur strictly prior to all testing actions. We choose anomalous samples only from the training user group and measure the performance on the evaluation user group. The training user group and the evaluation user group for each fold are mutually exclusive, so no evaluation user is seen during training. To ease comparison with some prior work, we evaluate the performance of a two-class classifier versus a one-class classifier for detecting changes in User behavior. Further, for all experiments, we report the average results over the cross-validation splits and compare the algorithms based on AUC (Area Under Curve), as it is the metric used in all previous work.

The evaluation results showed that the present invention provides uniformly better results compared to the one class classifier approach and the approach of providing synthetically constructed distributions of abnormal samples for training.

Implementations

Figure 9:
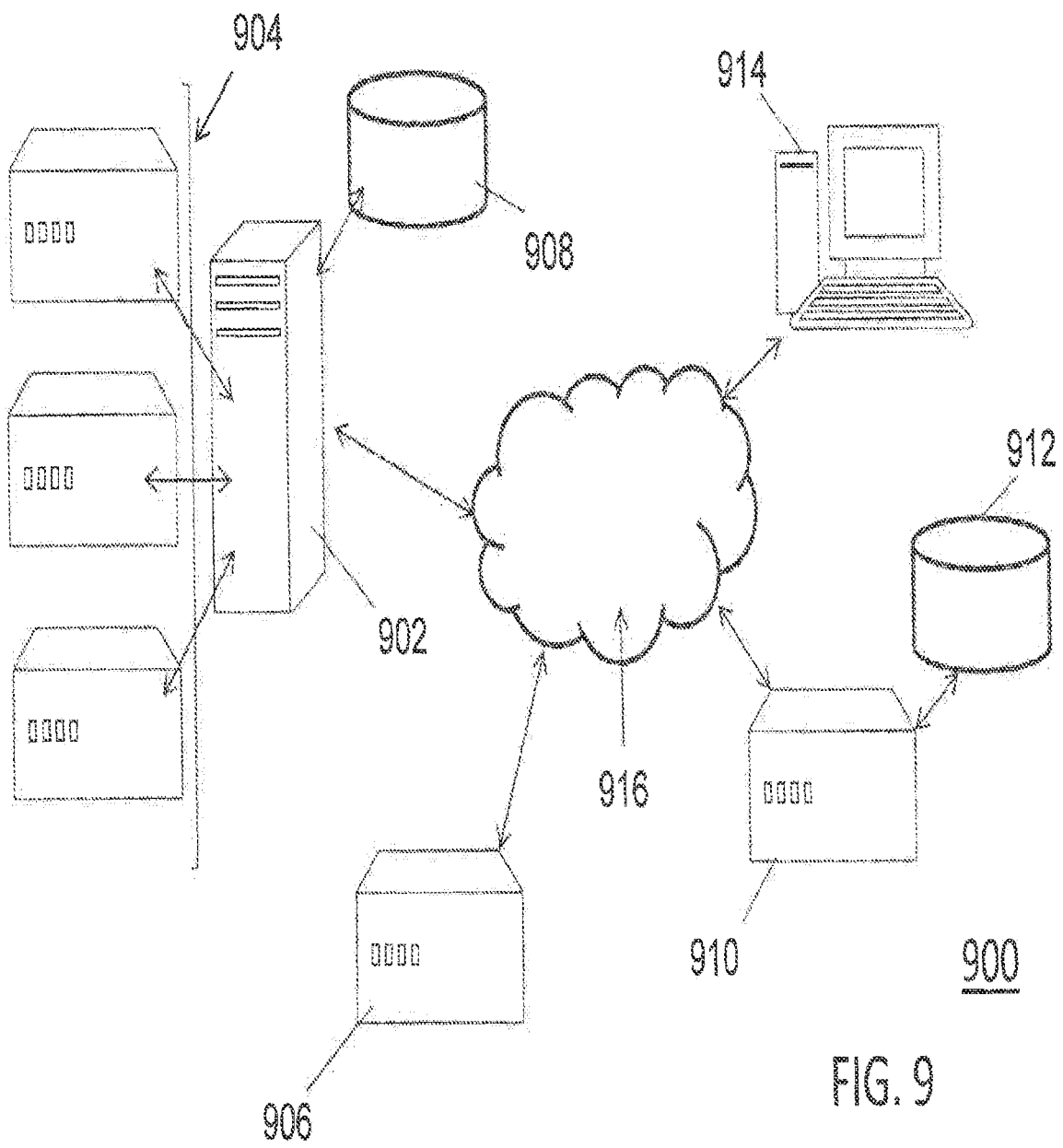
FIG. 9 shows exemplary mechanisms 900 by which the present invention could be implemented.

FIGS. 1-8 explained exemplary methods underlying the exemplary embodiments of the present invention. FIG. 9 shows details 900 of exemplary implementations of the invention in a network, as an implemented tool for use in generating anomaly detectors.

As initially developed, the prototype embodiment of the present invention was intended to be an application-type program selectively executable on a server 902 or gateway that serves as a portal to a protected site or network 904 associated with the shared system/application. If the protection is for an application available to different users then server 902 might store the application, which is then accessed by the various users 904. Since the invention serves a monitoring purpose, it might be preferable to at least periodically execute the process described in FIGS. 1-8, either under control of an operator/administrator or as automatically executed once during a predefined interval such as daily or weekly, etc. Such automatic execution could be implemented, for example, by configuring the application program that implements the present invention to execute periodically using a signal from the operating system of the computer 902. Other mechanisms for automatic periodic execution could include receipt of an initiation signal from a remote location 906.

Computer 902 is also shown as associated with a database 908 for storing sample data on the system or application users 904, as well as data from previous periodic executions. Such data would permit the system to evaluate longer periods of time, using stored data of from previous cycles as well as the data from the current execution period.

In a variation, the tooling of the present invention could be installed on a single computer 910 and providing monitoring for that computer alone, with computer 910 possibly having a memory device 912 for storage of monitoring history and/or current processing data concerning different users.

FIG. 9 also demonstrates another variation of the present invention in which the evaluation program described herein is offered as a service to other sites desiring to implement their exploit kit monitoring and detecting by the method of the present invention. In this variation, which could even be implemented as a cloud service, the user anomaly detection tool of the present invention is configured to communicate with another computer 914 for which monitoring is desired, as possibly located at the periphery of a network or enterprise, similar to server 902. Computer 914 would provide data for evaluation to the computer on the network executing the user anomaly detection tool development and/or monitoring, such as computer 902 or 910. The results of the evaluation could be returned to the remote computer 914 for action by a user/administrator at that remote location, or, possibly, the program execution computer 902, 910 could communicate with the remote computer 914 for automatic location/disposition of potential threats, such as automatic termination of web sessions detected as involving anomalous behavior.

In yet another alternative, computer 916 could be configured to download the anomaly detection development tool to remote computer 914 via a network, either by request or via an automatic, periodic downloading mechanism, in order to permit remote computer 914 to itself execute the anomaly detection tool. Typically, as a servicing tool for client users, the anomaly detection tool would be configured for a single execution by the remote computer 914 and would not remain resident in the remote computer 914. Other safeguards to preclude the anomaly detection development tool to be transferred to another computer without authorization could also be implemented.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, Memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiting human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, pith the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy; and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
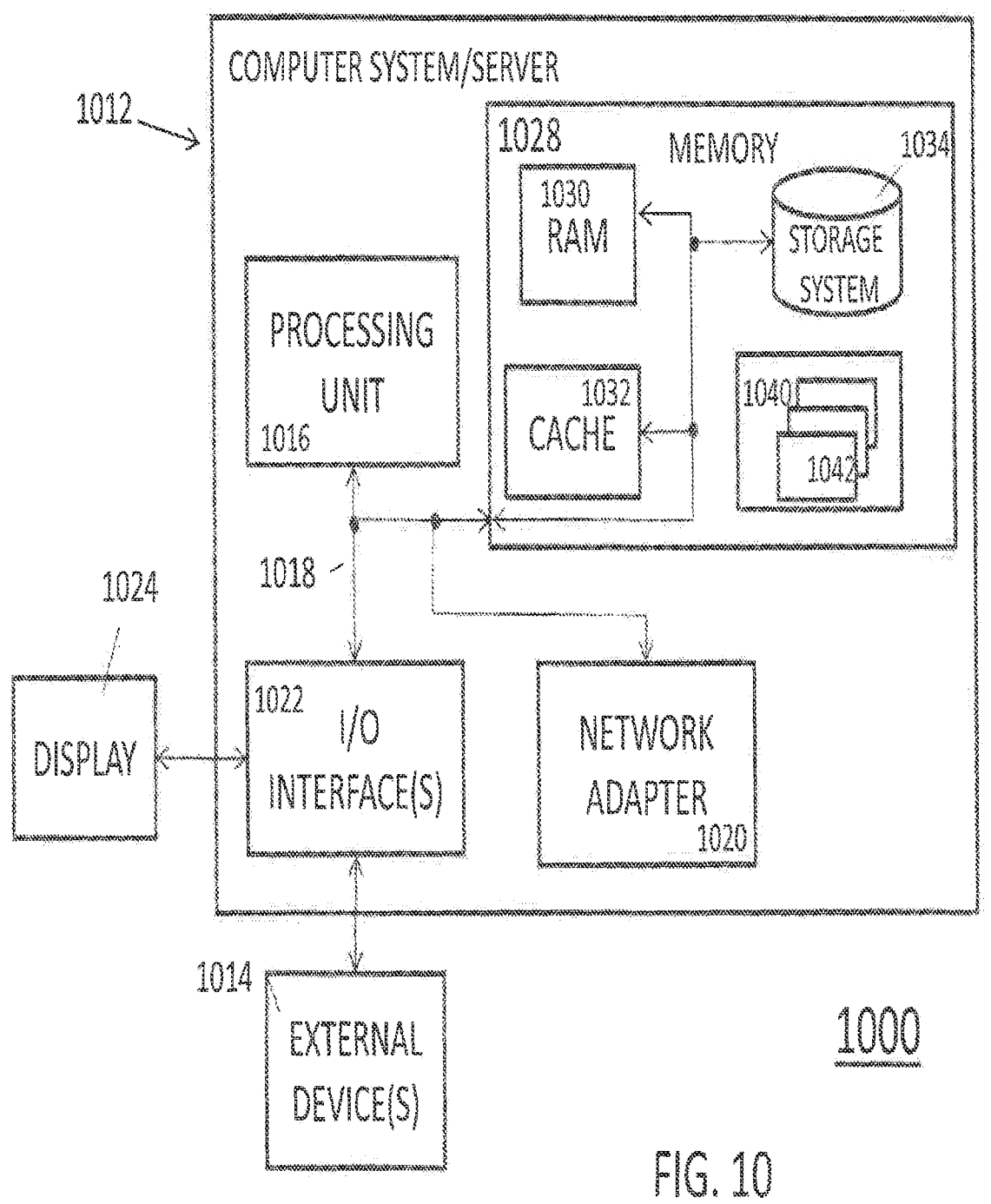
FIG. 10 depicts a cloud computing node 1000 according to an exemplary embodiment of the present invention.

Referring now to FIG. 10, a schematic 1000 of an example of a Cloud computing node is shown. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1012, which is operational with numerous other general purpose or special purpose computing system environments or configurations, Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include Other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CP-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules; and program data or some combination thereof, may include an implementation of a networking environment, Program modules 1042 generally carry out the functions and/or methodologies of embodiments of the invention as described herein.

Computer system/server 1012 may also communicate with one or more external devices 1014 such as a keyboard, a pointing device, a display 1024, etc., one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
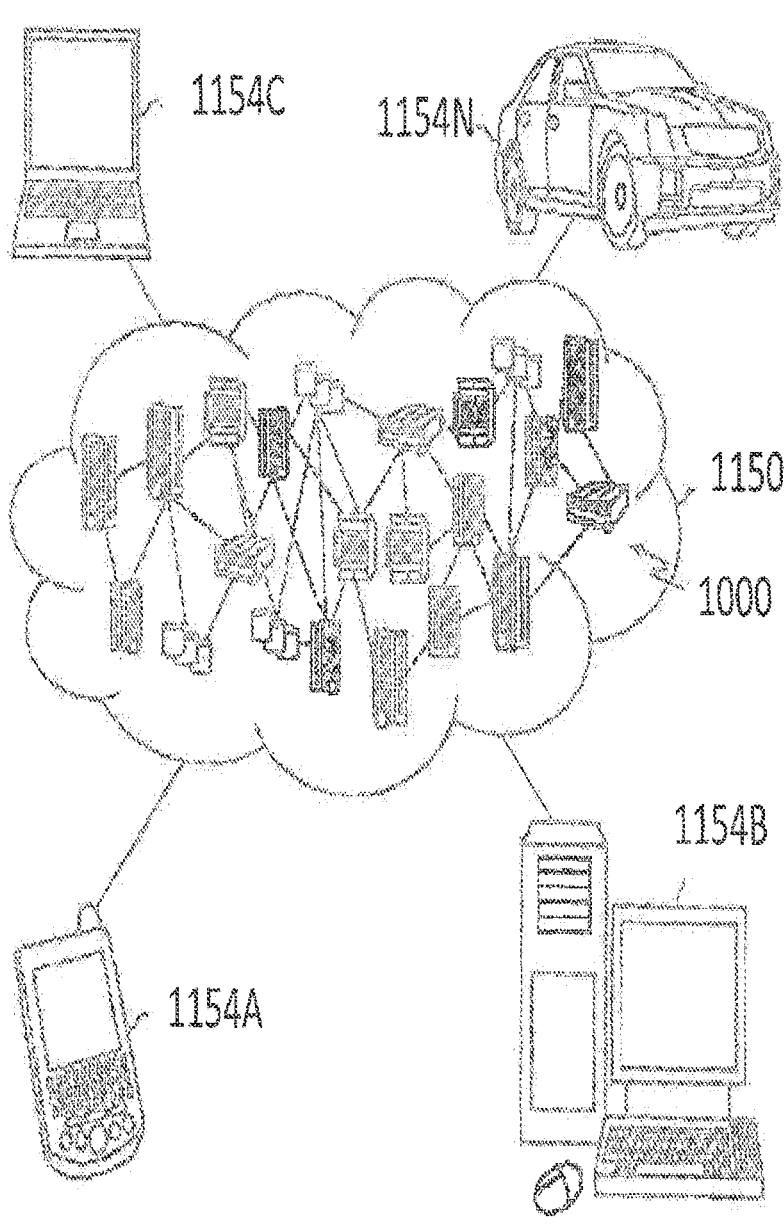
FIG. 11 depicts a cloud computing environment 1100 according to an exemplary embodiment of the present invention.

Retelling now to FIG. 11, an illustrative cloud computing environment 1150 is depicted. As shown, cloud computing environment 1150 comprises one or more cloud computing nodes 1000 with which local computing devices used by cloud consumers, such as, for example, personal digital assistant (PDA) or cellular telephone 1154A desktop computer 1154B, laptop computer 1154C, and/or automobile computer system 1154N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1000 and cloud computing environment 1150 can communicate with any type of computerized device over any type of network and/or network addressable connection (e.g., using a web browser).

Figure 12:
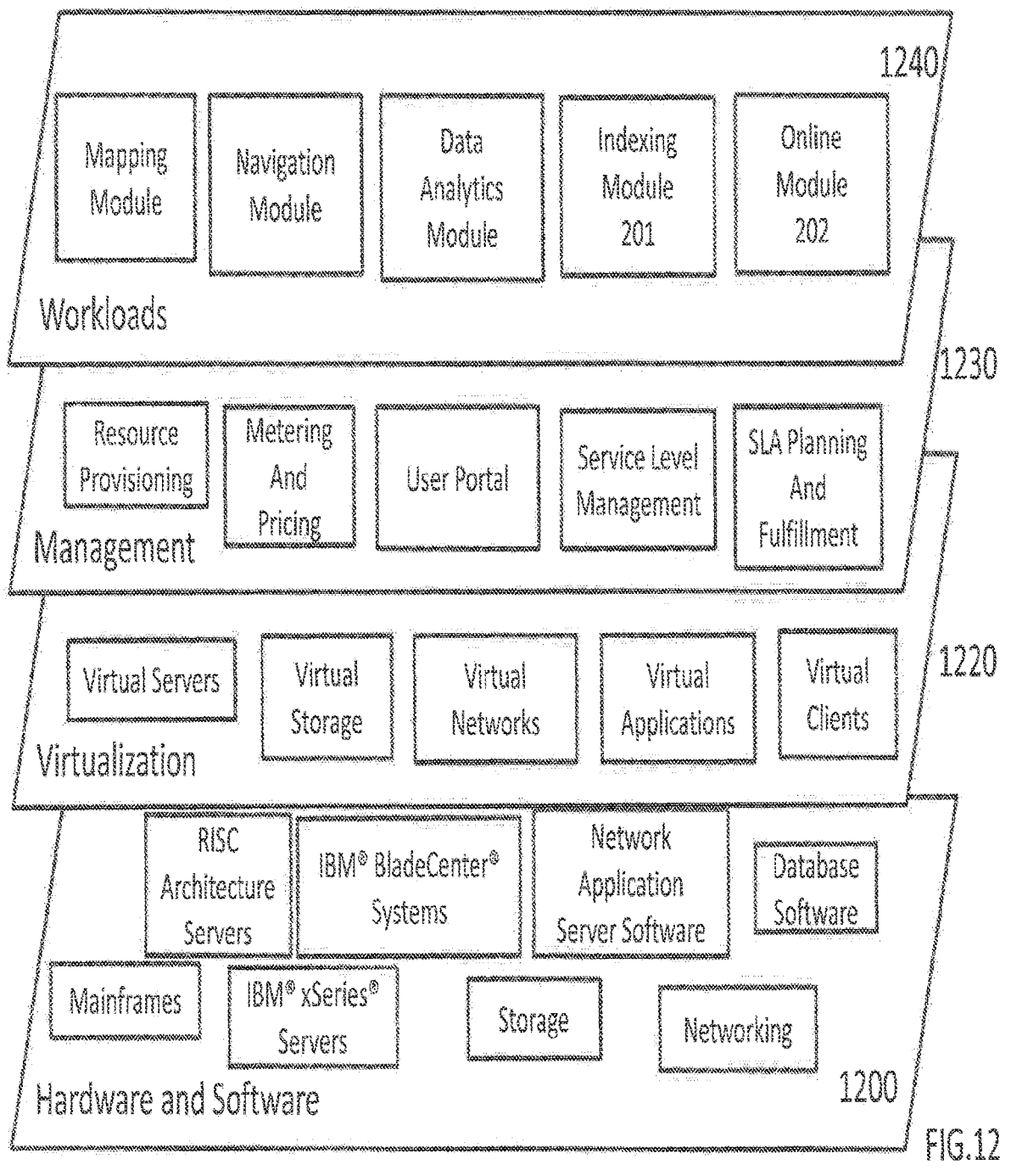
FIG. 12 depicts abstraction model layers 1200-1240 according to an exemplary embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1200 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 1200.

Virtualization layer 1220 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 1220.

In one example, management layer 1230 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources, in one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 1240 provides examples of functionality for which the cloud computing environment may be utilized. Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, the normal/abnormal sample set modules 600 exemplarily shown functionally in FIG. 6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of forming an anomaly detection monitor comprising:

obtaining data samples of operations performed on an application by a plurality of users; and detecting, by a processor, anomalous behavior associated with a target user of the plurality of users with respect to the application based on a portion of the data samples associated with the target user and a portion of the data samples associated with a second user of the plurality of users, different from the target user, wherein the second user of the plurality of users is selected based on determining a distance relationship between the portion of the data samples associated with the second user and the portion of the data samples associated with the target user, wherein determining the distance relationship comprises determining that the portion of the data samples associated with the second user are either among a subset of the data samples residing in regions of relatively low data density or among a subset of the data samples residing in regions of relatively high data density, as determined in relation to the portion of the data samples associated with the target user.

2. The method of claim 1, further comprising:

generating a normal sample data set based on the portion of the data samples associated with the target user;

generating an abnormal sample data set based on the portion of the data samples associated with the second user; and training a classifier based on the normal sample data set and the abnormal sample data set, wherein detecting the anomalous behavior associated with the target user is performed based on the classifier.

3. The method of claim 2, wherein generating the abnormal sample data set based on the portion of the data samples associated with the second user comprises deriving samples from low density areas of the portion of the data samples associated with the second user relative to the portion of the data samples associated with the target user using a Local Outlier Factor (LOF) function.

4. The method of claim 2, wherein the classifier is a machine-learning based classifier.

5. The method of claim 1, wherein detecting, by the processor, the anomalous behavior associated with the target user with respect to the application comprises generating a normal sample data set by executing a Local Outlier Factor (LOF) on the portion of the data samples associated with the target user to identify and remove outlier samples from the portion of the data samples associated with the target user.

6. A system comprising:

a memory; and a processor, operatively coupled to the memory, to:

obtain data samples of operations performed on an application by a plurality of users; and detect, by the processor, anomalous behavior associated with a target user of the plurality of users with respect to the application based on a portion of the data samples associated with the target user and a portion of the data samples associated with a second user of the plurality of users, different from the target user, wherein the second user of the plurality of users is selected based on determining a distance relationship between the portion of the data samples associated with the second user and the portion of the data samples associated with the target user wherein determining the distance relationship comprises determining that the portion of the data samples associated with the second user are either among a subset of the data samples residing in regions of relatively low data density or among a subset of the data samples residing in regions of relatively high data density, as determined in relation to the portion of the data samples associated with the target user.

7. The system of claim 6, further comprising:

generate a normal sample data set based on the portion of the data samples associated with the target user;

generate an abnormal sample data set based on the portion of the data samples associated with the second user; and train a classifier based on the normal sample data set and the abnormal sample data set, wherein detecting the anomalous behavior associated with the target user is performed based on the classifier.

8. The system of claim 7, wherein to generate the abnormal sample data set based on the portion of the data samples associated with the second user the processor is to derive samples from low density areas of the portion of the data samples associated with the second user relative to the portion of the data samples associated with the target user using a Local Outlier Factor (LOF) function.

9. The system of claim 7, wherein the classifier is a machine-learning based classifier.

10. The system of claim 6, wherein to detect the anomalous behavior associated with the target user with respect to the application the processor is to generate a normal sample data set by executing a Local Outlier Factor (LOF) on the portion of the data samples associated with the target user to identify and remove outlier samples from the portion of the data samples associated with the target user.

11. A non-transitory computer-readable storage medium including instructions that, when executed by a processor, cause the processor to:

obtain data samples of operations performed on an application by a plurality of users; and detect, by the processor, anomalous behavior associated with a target user of the plurality of users with respect to the application based on a portion of the data samples associated with the target user and a portion of the data samples associated with a second user of the plurality of users, different from the target user, wherein the second user of the plurality of users is selected based on determining a distance relationship between the portion of the data samples associated with the second user and the portion of the data samples associated with the target user wherein determining the distance relationship comprises determining that the portion of the data samples associated with the second user are either among a subset of the data samples residing in regions of relatively low data density or among a subset of the data samples residing in regions of relatively high data density, as determined in relation to the portion of the data samples associated with the target user.

12. The non-transitory computer-readable storage medium of claim 11, further comprising:

generate a normal sample data set based on the portion of the data samples associated with the target user;

generate an abnormal sample data set based on the portion of the data samples associated with the second user; and train a classifier based on the normal sample data set and the abnormal sample data set, wherein detecting the anomalous behavior associated with the target user is performed based on the classifier.

13. The non-transitory computer-readable storage medium of claim 12, wherein to generate the abnormal sample data set based on the portion of the data samples associated with the second user the processor is to derive samples from low density areas of the portion of the data samples associated with the second user relative to the portion of the data samples associated with the target user using a Local Outlier Factor (LOF) function.

14. The non-transitory computer-readable storage medium of claim 11, wherein to detect the anomalous behavior associated with the target user with respect to the application the processor is to generate a normal sample data set by executing a Local Outlier Factor (LOF) on the portion of the data samples associated with the target user to identify and remove outlier samples from the portion of the data samples associated with the target user.

\* \* \* \* \*